United States Patent [19]

Ohmura

[11] Patent Number: 4,802,299
[45] Date of Patent: Feb. 7, 1989

[54] REEL MOUNTING DEVICE ON FISHING RODS

[75] Inventor: Ryuichi Ohmura, Shizuoka, Japan

[73] Assignee: Fuji Kogyo Co., Ltd., Shizuoka, Japan

[21] Appl. No.: 84,024

[22] Filed: Aug. 11, 1987

[30] Foreign Application Priority Data

| Aug. 20, 1986 | [JP] | Japan | 61-194783 |
| Nov. 14, 1986 | [JP] | Japan | 61-272585 |
| May 29, 1987 | [JP] | Japan | 62-137426 |

[51] Int. Cl.⁴ ............................................. A01K 87/06
[52] U.S. Cl. ............................................................... 43/22
[58] Field of Search ............... 43/22; 403/350, DIG. 8

[56] References Cited

U.S. PATENT DOCUMENTS

| 402,594 | 5/1889 | Hook | 43/22 |
| 1,745,398 | 2/1930 | Beaty | 43/22 |
| 1,970,641 | 8/1934 | Bassett | 43/22 |
| 2,029,188 | 1/1936 | Potter | 43/22 |
| 2,076,629 | 4/1937 | Edwards | 43/22 |
| 2,145,612 | 1/1939 | Scogland | 43/22 |
| 2,885,816 | 5/1959 | Cunningham et al. | 43/22 |
| 3,512,293 | 5/1970 | Lumbard | 43/22 |
| 4,045,902 | 9/1977 | Ohmura | 43/22 |
| 4,376,397 | 3/1983 | Newby et al. | 16/115 |
| 4,485,580 | 12/1984 | Ohmura | 43/22 |

*Primary Examiner*—Kurt Rowan
*Attorney, Agent, or Firm*—Wegner & Bretschneider

[57] ABSTRACT

A reel mounting device on fishing rods comprises a first sleeve member having a first bore for passing the fishing rods, an annular recess for receiving a foot portion of the reel, and a first connecting portion, and a second sleeve member having a second bore for passing the fishing rods and a second connecting portion. The axes of the first and second bores are disposed eccentrically relative to the axes of the first and second connecting portions, respectively. The second connecting portion is adapted to rotatably and coaxially engage the first connecting portion.

10 Claims, 5 Drawing Sheets

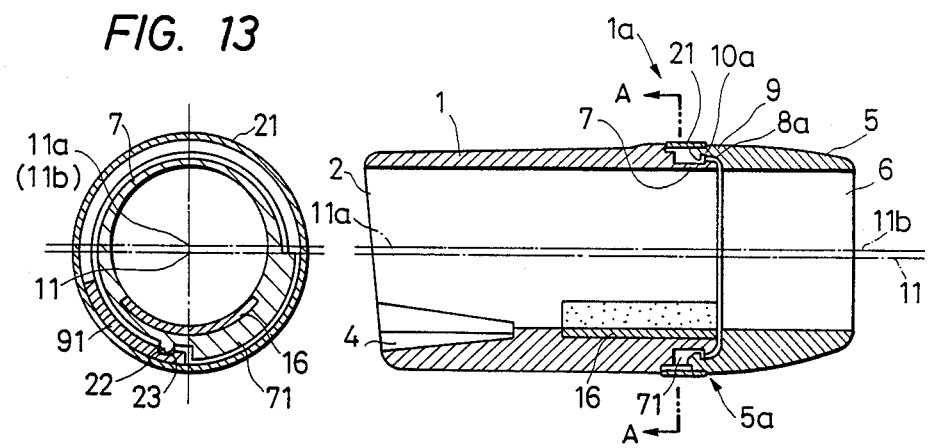
FIG. 13
FIG. 12
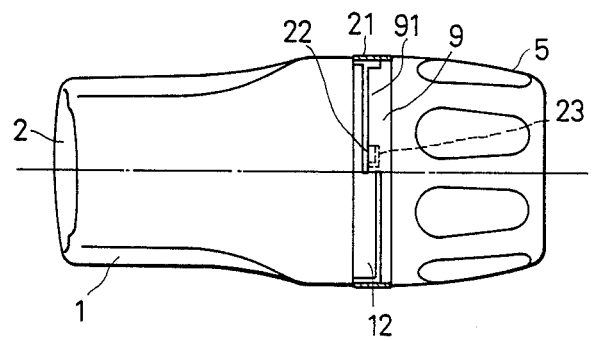
FIG. 14

REEL MOUNTING DEVICE ON FISHING RODS

BACKGROUND OF THE INVENTION

1. Field of the Invention

The present invention relates to a reel mounting device on fishing rods, and more particularly relates to an eccentric locking system for mounting.

2. Statement of the Prior Art

A conventional reel mounting device for use with fishing rods, which utilizes an eccentric locking system has been disclosed in, U.S. Pat. No. 1,970,641.

This locking system is comprised of an outer ring member and inner ring member, said outer ring member having an annular groove on the inner surface thereof, and said inner ring member fitted rotatably in the annular groove of the outer ring member. A bore for passing the fishing rod of the outer ring members is eccentrically disposed relative to the rotary axis and the diameter of the bore of the outer and inner ring members being larger than the outer diameter of the fishing rods. A bore passing the fishing rod of the inner ring member is provided with a recess for receiving a root portion of the reel. The fishing rods are inserted into the bores of the inner and outer ring members and the foot portion of the reel engages with the recess of the inner ring member. By turning, the outer ring member of the edges of the eccentric bores will press contact against the rod, while the foot portion of the reel is fastened on the rod.

However, when this device is mounted on a spinning rod the following troubles arise.

Since the mounting position of this device is the same as the position of the user's grip, the large projection of this device not only becomes an obstacle but is also easily unlocked by the user's hand.

Furthermore, when the user turns the outer ring member to lock the device, he may overly turn the ring and unlock the device instead.

SUMMARY OF THE INVENTION

The object of the present invention is to provide a reel mounting device on fishing rods, which has a smoother gripping surface.

Another object of the present invention is to provide a reel mounting device on fishing rods, which will not be easily unlocked by the user's hand while fishing.

Another object of the present invention is to provide a reel mounting device on fishing rods, which the user can not overturn the device and relock it instead of unlocking it.

According to the present invention, these objects are achieved by providing a reel mounting device on fishing rods comprising a first sleeve member having a first bore for passing said fishing rods, an annular recess for receiving a foot portion of the reel, and a first connecting portion; and a second sleeve member having a second bore for passing said fishing rods and a second connecting portion; wherein said annular recess is formed on the inner surface of said first bore at one end of said first sleeve member, said first connecting portion is formed on the other end of said first sleeve member. The axis of said second bore is disposed eccentrically relative to the axis of said second connecting portion, and said second connecting portion is adapted to rotatably and coaxially engage with said first connecting portion.

The reel mounting device of the present invention may further comprise an antislip piece formed of a flexible material. The antislip piece is disposed on a recess formed on the inner surface of the first bore on the opposite side of the annular recess.

The reel mounting device of the present invention further comprise a stopper mechanism which serves to limit a relative rotation between the first and second sleeve members to about 180 degrees. In this mechanism, a step made by the first and second sleeves is set to be substantially minimum at one end, while at the other end, the relative rotation is set to be substantially maximum.

The reel is fastened on the fishing rods by the following steps:

i. a pair of the foot portions of the reel are mounted on the fishing rods along the axis thereof.
ii. the reel foot portion is inserted into the annular recess of the first sleeve member to be supported on the rods.
iii. the second sleeve member is turned so that the axes of the first and second bores are disposed eccentrically relative to each other.
iv. the first sleeve member is locked on the rods by the compressive force of the second sleeve member.
v. the reel is fastened on the rods by the assembled members.

Many other advantages, features and additional objects of the present invention will become apparent to those skilled in the art upon reference to the detailed description and the accompanying drawings. Preferred structural embodiments incorporating the principles of the present invention are shown only by way of illustration.

BRIEF DESCRIPTION OF THE DRAWINGS

FIG. 12 is a sectional side view similar to FIG. 4 showing another embodiment of the reel mounting device in acccordance with the present invention;

FIG. 13 is a cross section taken along the line A—A of FIG. 12;

FIG. 14 is a partially broken bottom view of FIG. 12;

DETAILED DESCRIPTION OF THE PREFERRED EMBODIMENTS

Figure 1:
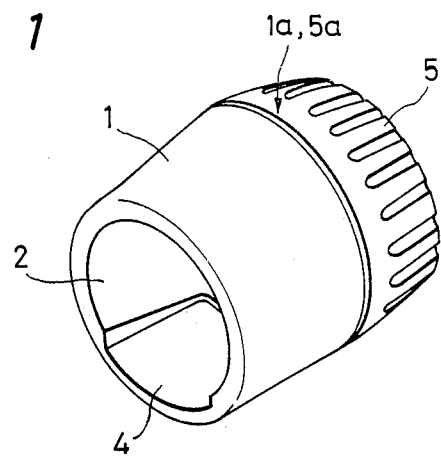
FIG. 1 is a perspective view of an embodiment of the reel mounting device in accordance with the present invention.

The preferred embodiments according to the present invention are now described, with reference to the drawings, in detail referring to the drawings. [EXAMPLE 1]

Figure 2:
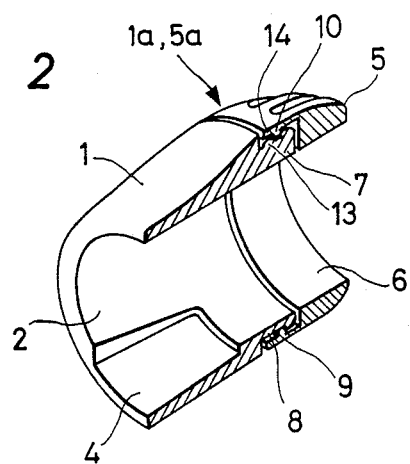
FIG. 2 is a perspective view of FIG. 1 broken away partially.

In FIGS. 1 and 2, the reel mounting device for a reel on fishing rods comprises a first sleeve member 1 and a second sleeve member 5, the first sleeve member 1 being made of a hard plastic material. The member 1 has a first bore 2 for passing the fishing rod. An annular recess 4 is formed on the inner surface of the bore 2 at one end of the member 1. The annular recess 4 is tilted outwardly. A first connecting portion 1a is formed on the other end 7 of the first sleeve member 1. The portion 1a includes an annular groove 8 formed on the outer surface of the other end 7 of the first sleeve member, and if desired, an axial projection 13 may be formed in the groove 8.

The second sleeve member 5 is made of a hard plastic material. The member 5 has a second bore 6 for passing the fishing rod. The bore 6 is adapted to communicate with the bore 2. A second connecting portion 5a is formed on one end 9 of the second sleeve member 5. The portion 5a includes an annular projection 10 formed on the inner surface of the one end 9 of the second sleeve member, and; if desired, an axial groove 14 may be formed on the projection 10.

Figure 6:
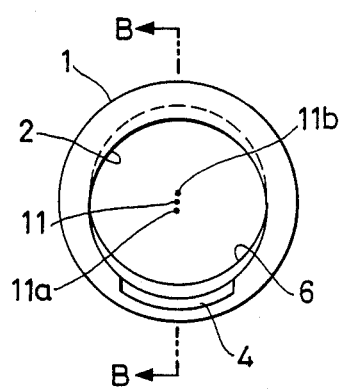
FIG. 6 is an elevational view similar to FIG. 3, showing bores for passing the fishing rods in the eccentric positions relative to the rotary axis.
Figure 7:
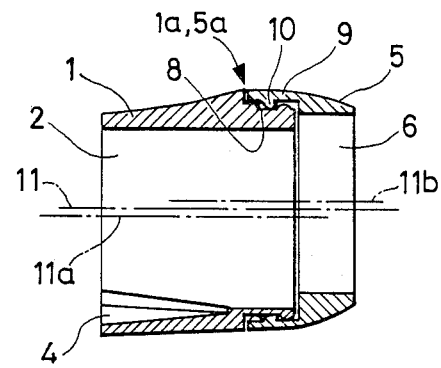
FIG. 7 is a sectional side view taken along the line B—B of FIG. 6.

As shown in FIGS. 6 and 7, the axis 11a of the first bore 2 is disposed eccentrically relative to the axis 11 of the first connecting portion 1a. Similarly, the axis 11b of the second bore 6 is disposed eccentrically relative to the axis 11 of the second connecting portion 5a.

Figure 3:
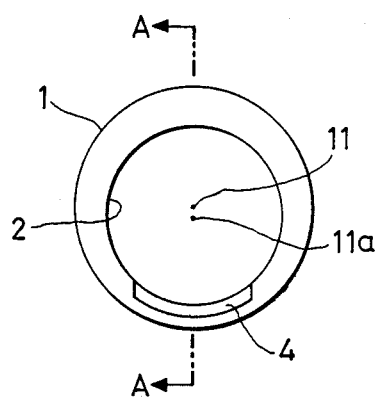
FIG. 3 is an elevational view of FIG. 1.
Figure 4:
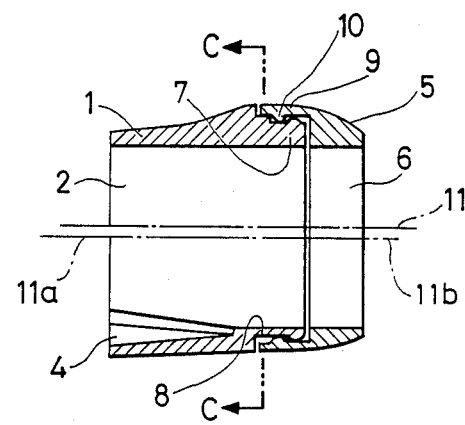
FIG. 4 is a sectional side view taken along the line A—A of FIG. 3.

As shown in FIGS. 3 and 4, the first and second sleeve member 1 and 5 are rotatably coupled with each other by engaging the first and second connecting portions 1a and 5a. Then, the annular projection 10 of the second connecting portion 5a engages rotatably with the annular groove 8 of the first connecting portion 1a. Thus, the first and second sleeve members can relatively rotate about the axis 11 of the first and second connecting portions 1a and 5a.

Figure 8:
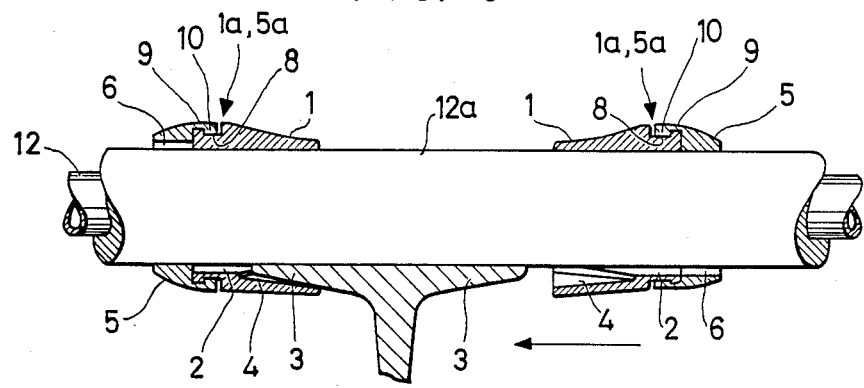
FIG. 8 is a sectional side view similar to FIG. 4, showing the reel mounting device in use.
Figure 10:
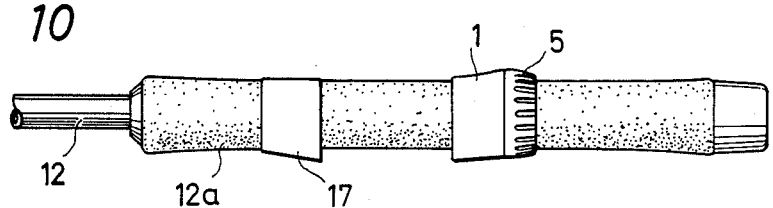
FIGS. 10 and 11 are partial elevational view of fishing rods in use, showing the embodiments in FIGS. 2 and 9.
Figure 11:
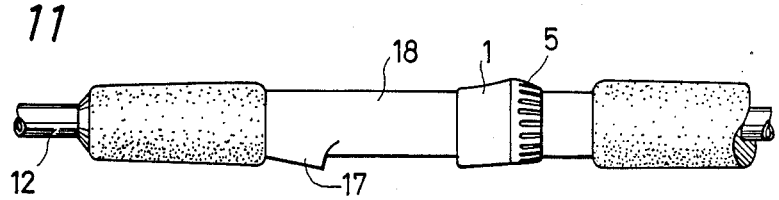
Figure 15:
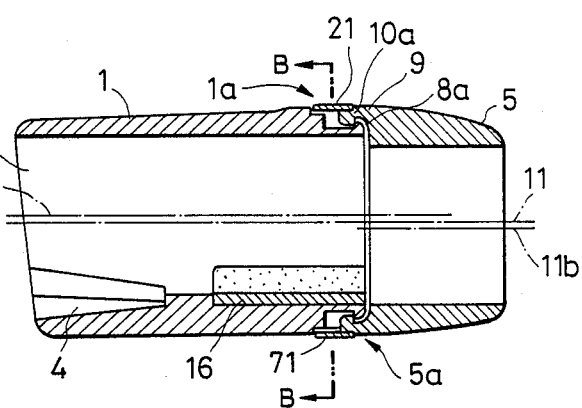
FIG. 15 is a sectional side view similar to FIG. 12 showing a second sleeve member, turned 180 degrees from the position shown in FIG. 12.
Figure 16:
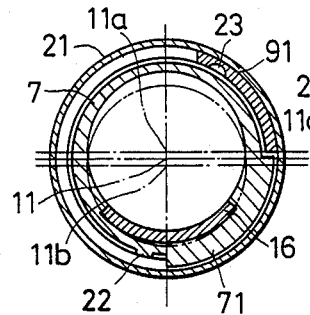
FIG. 16 is a cross section taken along the line B—B of FIG. 15.
Figure 17:
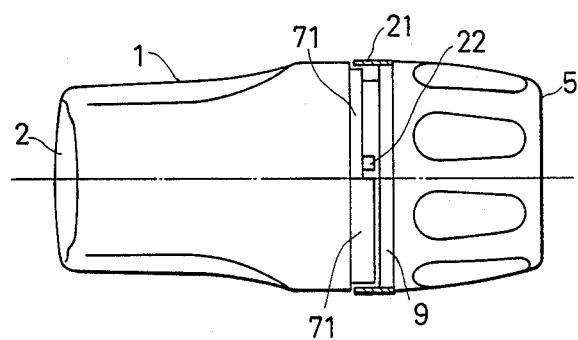
FIG. 17 is a partially broken bottom view of FIG. 15.

In FIGS. 8 and 10, fishing rods 12 have a grip 12a made of a cork material on the periphery of the rods. A hood 17 may be secured on the grip 12a to receive the foot portion 3 of the reel. In FIG. 11, the fishing rod 12 has a pipe 18 made of a hard material on the periphery of the rod. A hood 17 may be integrally formed on the pipe 18.

Figure 5:
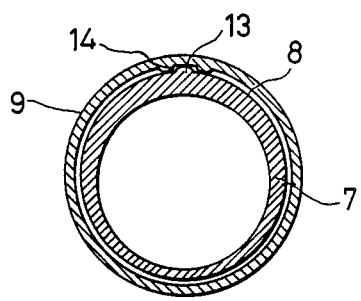
FIG. 5 is a cross section taken along the line C—C of FIG. 4.

As shown in FIGS. 3, 4, and 5, when the second sleeve member 5 is turned relative to the first sleeve member 1, about axis 11, until the axial groove 14, of the second connecting portion 5a of the member 5, engages with the axial projection 13 of the first connecting portion 1a of the member 1, the axis 11b of the second bore 6 is coincident with the axis 11a of the first bore 2. Then, the relative rotation between the first and second sleeve members 1 and 5 is prevented against a slight external force.

As shown in FIG. 8, the foot portions 3 of the reel are axially mounted on the grip 12a of the fishing rods 12 while the assembled members 1, 5 engage with the grip 12a and the axis 11a is coincident with the axis 11b. The assembled members 1, 5 or the mounting device are moved along the grip 12a in the direction of the arrow so that the annular recess 4 receives the foot portion 3 of the reel to secure it to the grip 12a.

As shown in FIGS. 6 and 7, when the second sleeve member 5 is turned within half a revolution about the axis 11, the axis 11b of the second bore 6 is disposed away from the axis 11a eccentrically relative to the axis 11. Thus, the inner surface of the second bore 6 bites the grip 12a to lock the assembled members 1, 5 on the grip 12a. Accordingly, the foot portion 3 of the reel is firmly fastened on the grip 12a.

When the second sleeve member 5 is turned in the reverse direction from the locking position (FIGS. 3 and 4) the axis 11b is coincident with the axis 11a to the unlocking position (FIGS. 6 and 7) and the axis 11b is disposed away from the axis 11a eccentrically relative to the axis 11. Thus, the assembled members 1, 5 can move axially along the grip 12a. The reel can be removed from the grip 12a by shifting the assembled members 1, 5 backward as shown in FIG. 8.

As shown in FIG. 10, one of the pair of the assembled members 1, 5 may be replaced with a hood 17 secured to the grip 12a. [EXAMPLE 2]

This embodiment is suitable for the fishing rods having the pipe 18 (FIG. 11) made of a hard material.

Figure 9:
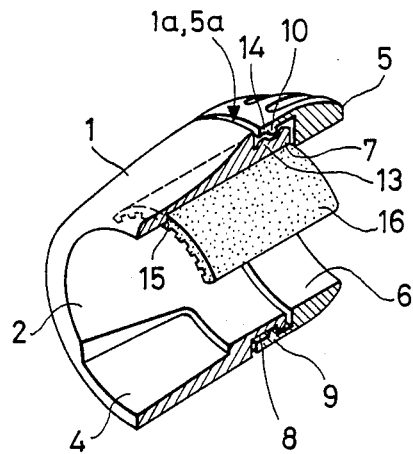
FIG. 9 is a sectional perspective view similar to FIG. 2, showing another embodiment of the reel mounting device in accordance with the present invention.

In FIG. 9, the embodiment of the reel mounting device of the present invention further comprises an antislip piece 16 formed of a flexible material, such as rubber, soft plastic, and the like. The numerals used in Example 2 refer to the corresponding parts in Example 1.

In FIG. 9, the antislip piece 16 is disposed on a recess 15 formed on the inner surface of the first bore 2 on the opposite side of the annular recess 4.

In this embodiment, as described hereinbefore, the fishing rod 12 having the pipe 18, is inserted into the first and second bores 2 and 6 with the axis 11a being coincident with the axis 11a. The foot portions 3 of the reel are axially mounted on the pipe 18 of the fishing rods 12. The assembled members 1, 5 are moved along the pipe 18 so that the annular recess 4 receives the foot portion 3 of the reel to secure it to the pipe 18. Then, the antislip piece 16 grasps the pipe 18.

When the second sleeve member 5 is turned about the axis 11 within half a revolution, the axis 11b of the second bore 6 is disposed away from the axis 11a eccentrically relative to the axis 11 as shown in FIGS. 6 and 7. Thus the inner surface of the second bore 6 grasps the pipe 18 to lock the assembled members 1, 5. When the second sleeve member 5 is turned in the reverse direction from the locking position so that the axis 11b is coincident with the axis 11a, the locking is released.

As shown in FIG. 11, one of the pair of the assembled members 1, 5 may be replaced with a hood 17 formed on the pipe 18.

This embodiment may be applied to the grip 12a made of a cork material. [EXAMPLE 3]

In the above example, the second sleeve member 5 can be turned relative to the first sleeve member 1 in either direction. When the second sleeve is turned greater than 180 degrees, the assembled members 1 and 5 may be refastened or reloosened. Accordingly, the third embodiment aims to avoid such misoperation.

The third embodiment is illustrated in FIGS. 12 through 17. The same reference numbers shown in FIGS. 12 through 17 as those in FIGS. 1 through 11 represent the same elements or portions, respectively.

The first connecting portion 1a includes an annular projection 8a formed on the outer surface of the other end 7 of the first sleeve member. The second connecting portion 5a includes an annular groove 10a formed on the inner surface of the one end 9 of the second sleeve member. The annular projection 8a is rotatably coupled to the annular groove 10a. The first and second sleeves 1 and 5 are coupled with each other rotatably about the axis 11 of the first and second connecting portions 1a and 5a. The axis 11a of the first bore 2 and the axis 11b of the second bore 6 are disposed eccentrically relative to the axis 11.

A projection 71 is formed on the side face of the root of the other end 7 of the first sleeve member. Tongue 91 extends outwardly from the extremity of the one end 9 of the second sleeve member. The Projection 71 and tongue 91 constitute a stopper mechanism which serves to limit the relative rotation between the first and second sleeve members 1 and 5 to about 180 degrees. For example, when the second sleeve member 5 is turned to the anticlockwise direction until the tongue 91 abuts against the projection 71 (see FIG. 13), a step made by first and second sleeves between the axes 11a and 11b is set to be substantially minimum. Similarly, when the second sleeve member 5 is turned to the clockwise direction until the tongue 91 abuts against the projection 71 (see FIG. 16), the step made by first and second sleeves is set to be substantially maximum. This condition is interchangeable.

A metal ring 21 is fitted on the outer surface of the second connecting portion 5a to prevent the second sleeve member 5 from expanding and prevent dusts or the like from entering into the clearance.

A protrusion 22 formed on the other end 7 of the first sleeve can engage with a concave 23 formed on the inner surface of the tongue 91 to maintain the position of the minimum eccentric distance.

In the reel mounting device according to the present invention, the first sleeve member, having an annular recess for receiving the foot portion of the reel, and the second sleeve member, are rotatably coupled with each other at the first and second connecting portions. In addition, the sleeves are generally formed in thin thicknesses. Accordingly, the projects only slightly from the surface of the fishing rod and thus the user can handle the rod very smoothly. Even if the user holds the device while hooking his finger on the reel foot portion, the second sleeve member can not be turned by his touch. Accordingly, the device can not be loosened during fishing. The rotary directions for fastening and loosening the assembled members are clearly distinguished from each other. Thus, there is little chance of misoperation or breakage of the assembled members.

I claim:

1. A reel mounting device for use with a fishing rod, comprising:
   a first elongated sleeve member having a first bore for passing said fishing rod, a first and second end, and an inner surface;
   a first longitudinal recess for receiving a foot portion of the reel, said longitudinal recess being formed in the inner surface of said first sleeve member at said first end of said first sleeve member with said first longitudinal recess being formed partially along the length of the first sleeve member;
   a first annular connecting portion, said first connecting portion being formed at the second end of said first sleeve member;
   a second elongated sleeve member having a second bore for passing said fishing rod, and a first and second end;
   a second annular connecting portion, said second connecting portion being formed at the first end of said second sleeve member;
   wherein the axis of said first bore is eccentrically disposed relative to the axis of said first annular connecting portion and the axis of said second bore is eccentrically disposed relative to the axis of said second annular connecting portion with said second annular connecting portion being adapted to rotatably connect and coaxially cooperate with said first connecting portion.

2. A device according to claim 1, further comprising an antislip piece having an upper and lower surface, formed of a flexible material, said antislip piece being disposed within a second longitudinal recess formed in the inner surface, opposite to the location of said first longitudinal recess of said first sleeve member, with said second recess being formed partially along the length of the first sleeve member.

3. A device according to claim 2, wherein said antislip piece is provided with a plurality of grooves on its lower surface such that the grooved surface engages the fishing rod.

4. A device according to claim 3, wherein the antislip piece is made from a member of the group consisting of rubber and soft plastic.

5. A device according to claim 1, wherein one connecting portion comprises an annular recess and the other connecting portion comprises an annular protrusion adapted to cooperate therewith.

6. A device according to claim 5, wherein said annular recess is provided in an outer surface of one connecting portion and said annular protrusion extends from an inner surface of the other connecting portion.

7. A device according to claim 6, wherein said one connecting portion, is rotatably received with said other connecting portion.

8. A device according to claim 7, further comprising a stopper mechanism for limiting relative rotation between said first and second elongated sleeve members to about 180 degrees.

9. A device according to claim 8, wherein the stopper mechanism comprises:
   a projection formed on said outer surface of said one connecting portion;
   an outwardly extending tongue formed on an outer surface of said second connecting portion,
   wherein said projection and said tongue are rotatably engageable so as to limit relative rotation between said first and second elongated sleeve members to 180 degrees.

10. A device according to claim 3, wherein one connecting portion is said first connecting portion and said other connecting portion is said second connecting portion.

* * * * *